(12) United States Patent
Hoarty et al.

(10) Patent No.: US 12,089,014 B2
(45) Date of Patent: Sep. 10, 2024

(54) SYSTEMS AND METHODS FOR SELECTIVELY POWERING TV REMOTE MICROPHONES

(71) Applicant: Vizio, Inc., Irvine, CA (US)

(72) Inventors: W. Leo Hoarty, Morgan Hill, CA (US); Glen Gihong Kim, Anaheim, CA (US)

(73) Assignee: Vizio, Inc., Irvine, CA (US)

( * ) Notice: Subject to any disclaimer, the term of this patent is extended or adjusted under 35 U.S.C. 154(b) by 195 days.

(21) Appl. No.: 17/715,873

(22) Filed: Apr. 7, 2022

(65) Prior Publication Data

US 2022/0329938 A1    Oct. 13, 2022

Related U.S. Application Data

(60) Provisional application No. 63/172,392, filed on Apr. 8, 2021.

(51) Int. Cl.
*H04R 3/00*   (2006.01)
*G10L 25/48*   (2013.01)
(Continued)

(52) U.S. Cl.
CPC ............. *H04R 3/005* (2013.01); *G10L 25/48* (2013.01); *H04N 7/04* (2013.01); *H04R 1/04* (2013.01);
(Continued)

(58) Field of Classification Search
CPC .......... H04R 3/005; H04R 1/04; H04R 1/406; H04R 2420/07; G10L 25/48; H04N 7/04; H02J 7/0044
(Continued)

(56) References Cited

U.S. PATENT DOCUMENTS 5,267,323 A * 11/1993 Kimura ............... H04B 1/48
704/E15.045
6,043,626 A *  3/2000 Snyder ............... H02J 7/0044
379/442

(Continued)

OTHER PUBLICATIONS

Roettgers, Janko, CES Trend: "Your Next Smart Speaker May Be a TV", Jan. 9, 2019, Variety.com https://variety.com/2019/digital/news/smart-tvs-far-field-voice-control-1203103141/.

*Primary Examiner* — Vivian C Chin
*Assistant Examiner* — Douglas J Suthers
(74) *Attorney, Agent, or Firm* — Hansen IP Law PLLC (57) ABSTRACT

A remote control with a microphone subsystem comprising a pair of internal microphones is shown and described. When connected to a remote-control base station that is itself connected to an external power source, the microphone subsystem is continuously energized by the external power source, and the pair of internal microphones operate as far field microphones that receive oral commands uttered by a user from a distance. When the remote control is removed from the base, the microphone subsystem is configured for selective connection to an internal power source by actuating a user control on the remote control. In the external power source mode, signals from both microphones are digitally processed to provide a far-field microphone array with beam forming. In the direct current mode, only one microphone's signals are digitally processed as a simple monaural signal (or they are not digitally processed). The remote control also includes a video camera capable of capturing video image data of the user and transmitting it to an associated television for facial recognition of the user.

19 Claims, 8 Drawing Sheets

(51) Int. Cl.
*H02J 7/00* (2006.01)
*H04N 7/04* (2006.01)
*H04R 1/04* (2006.01)
*H04R 1/40* (2006.01)

(52) U.S. Cl.
CPC ............ *H04R 1/406* (2013.01); *H02J 7/0044* (2013.01); *H04R 2420/07* (2013.01)

(58) Field of Classification Search
USPC .................................................. 381/91, 110
See application file for complete search history.

(56) References Cited

U.S. PATENT DOCUMENTS

| | | | |
|---|---|---|---|
| 6,584,439 B1 | 6/2003 | Geilhufe et al. | |
| 2005/0046751 A1 | 3/2005 | Simmons | |
| 2013/0335196 A1 | 12/2013 | Zhang et al. | |
| 2017/0070066 A1* | 3/2017 | Ng .......................... | H02J 7/0045 |

* cited by examiner

SYSTEMS AND METHODS FOR SELECTIVELY POWERING TV REMOTE MICROPHONES

CROSS REFERENCE TO RELATED APPLICATIONS

This application claims the benefit of U.S. Provisional Patent Application No. 63/172,392, filed on Apr. 8, 2021, the entirety of which is hereby incorporated by reference.

TECHNICAL FIELD

The present disclosure relates to far field microphones provided in remote controls used for controlling external devices such as televisions, and more specifically, to methods of selectively switching power supplies used for such microphones to enhance both far and near field capabilities.

BACKGROUND

Consumer electronic products are increasingly utilizing speech recognition. There are two approaches to providing this service with respect to remote controls. According to the first approach, a near-field microphone is installed in the remote control, and the user presses a push to talk button to power the microphone when issuing a command or otherwise transmitting speech in the form of audio signals to a device operated by the remote control. According to the second approach, far-field microphones are embedded in the device (e.g., a TV), and the user can speak at any time (usually starting with a "wake-up command") to trigger the speech recognition process, for example as with Apple's "Siri."

When used in far field applications, the microphone must stay on and powered at all times in order to be ready respond to user commands issued from a distance. Thus, a power source that continuously supplies power to the microphone is required. In the case of some television remote controls, a power source of AC or DC, typically from a common power adaptor, also known as the ubiquitous "wall wart," plugged into a power outlet, may be supplied by a base station or dock into which the remote control is inserted. Unfortunately, this means that the microphone cannot be used when the remote is removed from the dock (and hence disconnected from the power source) and used in near field applications. Conversely, if the remote is configured for battery operation, it must either remain continuously on or it must require the user to depress a button to supply power from the battery source within the remote control to the microphone. In the former case, the battery power supply would quickly become drained. In the latter case, far field functionality would be compromised because of the necessity for physically engaging the controller to issue commands. Thus, a need has arisen for a remote control with a dual-function microphone system that addresses the foregoing issues.

SUMMARY

In accordance with a first aspect of the present disclosure, a remote control is provided. The remote control comprises a microphone subsystem operatively connected to a transceiver, and the microphone subsystem comprises at least one microphone. The remote control also comprises remote control electrical contacts for connecting the remote control to an external power source and an internal power source. When the remote-control electrical contacts are connected to the external power source, the external power source continuously supplies power to the microphone subsystem, and when the remote-control electrical contacts are not connected to the external power source, the internal power source is selectively connectable to the microphone subsystem. In certain examples, the external power source is provided through a physical connection between the remote control and a remote-control base station or base stand. In the same or other examples in which the remote control is handheld, the internal power source is an internal battery. In certain examples, the at least one microphone is a first microphone and a second microphone. In additional examples, when the remote-control electrical contacts are connected to the external power source, the microphone subsystem processes speech received by the at least two microphones as a far-field microphone array with beam forming. In the same or other examples, when the remote-control electrical contacts are not connected to the external power source, speech received by the at least one microphone is processed as a monaural signal in a near-field modality.

In additional examples, a remote-control system comprising the remote control and a remote-control base station is provided, and the remote-control base station comprises base electrical contacts that are selectively engageable with the remote-control electrical contacts to electrically connect the external power source to the microphone subsystem.

In accordance with a second aspect of the present disclosure, a method of providing speech audio signals to a television is provided. The method comprises providing a remote control having a microphone subsystem comprising at least one microphone, wherein the microphone subsystem is connected to an external power source. The method further comprises disconnecting the microphone subsystem from the external power source, thereby causing the microphone subsystem to be selectively connectable to an internal power source such as a battery. In certain examples, the method further comprises operating a control on the remote to connect the microphone subsystem to the internal power source and speaking into the microphone.

In accordance with a third aspect of the present disclosure, a remote control comprising a video camera is provided. The video camera produces continuous video when the remote control is docked in its base, and the base is connected to an external power source. In certain examples, the external power source is a power adapter plugged into a wall outlet. When the remote control is disconnected from the external power source, it remains in very-low-power mode until a user control is actuated. Upon actuation of the user control, the remote will exit the standby state and activate its circuitry, allowing the camera to capture one or a few images to send via Bluetooth to the TV, typically for facial recognition.

In accordance with a fourth aspect of the present disclosure, a non-transitory computer readable medium is provided which has a set of computer executable instructions stored thereon, wherein when executed by a processor, the instructions perform a method comprising detecting whether a remote control comprising a processor, a user control, and a microphone subsystem operatively connected to a transceiver is electrically connected to an external power source and configuring the microphone subsystem for selective connection to an internal power source in response to a selected user control manipulation if the remote control is not electrically connected to an external power source.

DETAILED DESCRIPTION

Described below are examples of remote controls having a microphone subsystem comprising at least one microphone. The microphone subsystem is operable in two modes. In an external power mode, the microphone subsystem is electrically connected to an external power source, for example, one provided by a base stand upon or in which the remote control sits. In this mode, the at least one microphone can detect speech at any time because no user engagement with the remote control is required in order for the at least one microphone to detect speech. In an internal power mode, the at least one microphone is disconnected from the external power source and is selectively connectable (by the user) to an internal power source, such as batteries contained within the remote control. In the internal power mode, the user must manipulate a user control, such as a push to talk button, on the remote control in order for the microphone subsystem to be energized by the internal power source, which prevents the batteries from draining quickly. Also, in the external power mode, the microphone subsystem is disconnected from the internal power source and is not selectively connectable to it by the user. In certain examples, the at least one microphone comprises two microphones, and in the external mode, the microphone subsystem processes detected speech as a far-field microphone array audio signal with beam forming, while in the internal power mode, the detected speech is processed as monaural signals.

Figure 1:
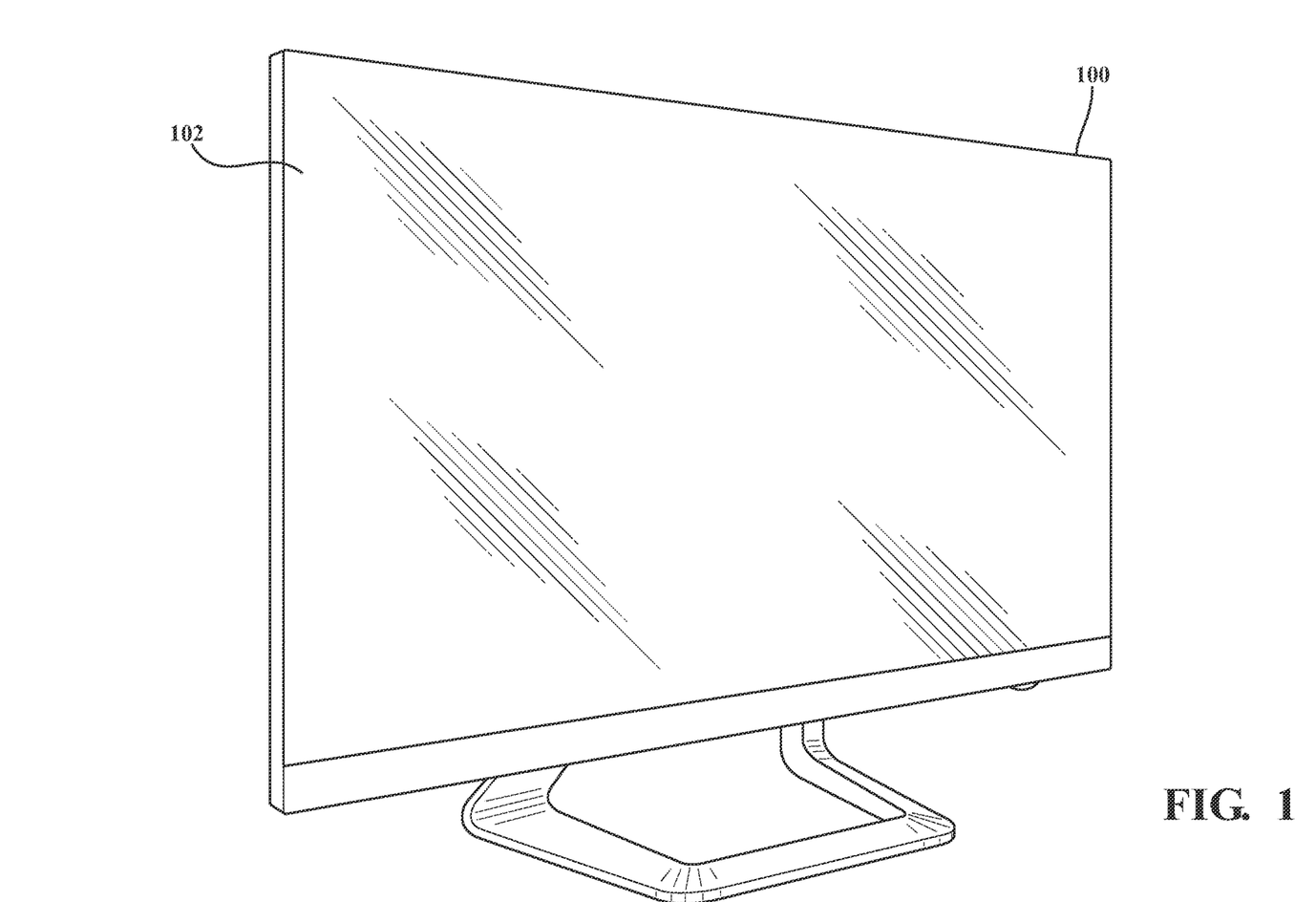
FIG. 1 depicts a Smart TV television configured for internal processing of audio and video.

Turning to FIG. 1, a smart TV 100 is depicted. Smart TV 100 includes a display 102. As described further below, smart TV 100 also includes a processing system 1400 (FIG. 7) for receiving and processing images, video, audio, graphics, etc. as well as for receiving and executing orally-issued television operational commands (volume up/down, channel up/down, channel select, play/reverse/fast-forward) via first microphone 103a and/or second microphone 103b or receiving, processing, and/or transmitting audio speech signals (i.e., acoustic soundwaves produced by a person speaking which are converted to audio signals) with other types of content which are received from a user. First and second motion sensors 104a and 104b may also be provided.

Figure 2A:
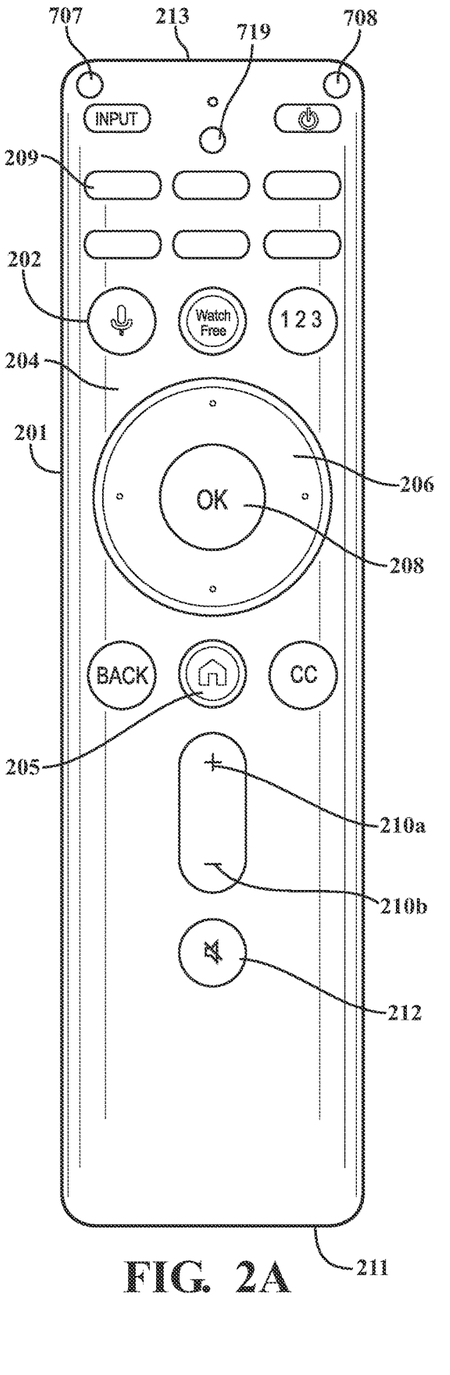
FIG. 2A is a front elevational view of a first embodiment of a remote control with a microphone subsystem that is selectively connectable to both internal and external power sources, shown in an undocked configuration.
Figure 2B:
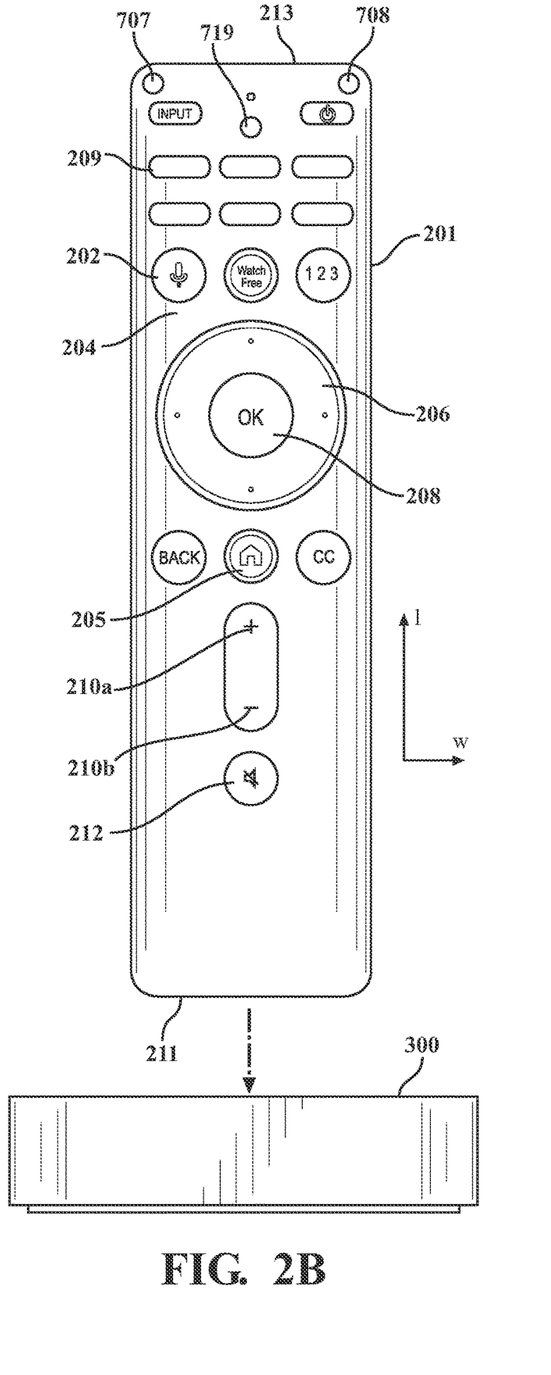
FIG. 2B is a front elevational view of the remote control of FIG. 2A, shown during a docking operation.
Figure 3:
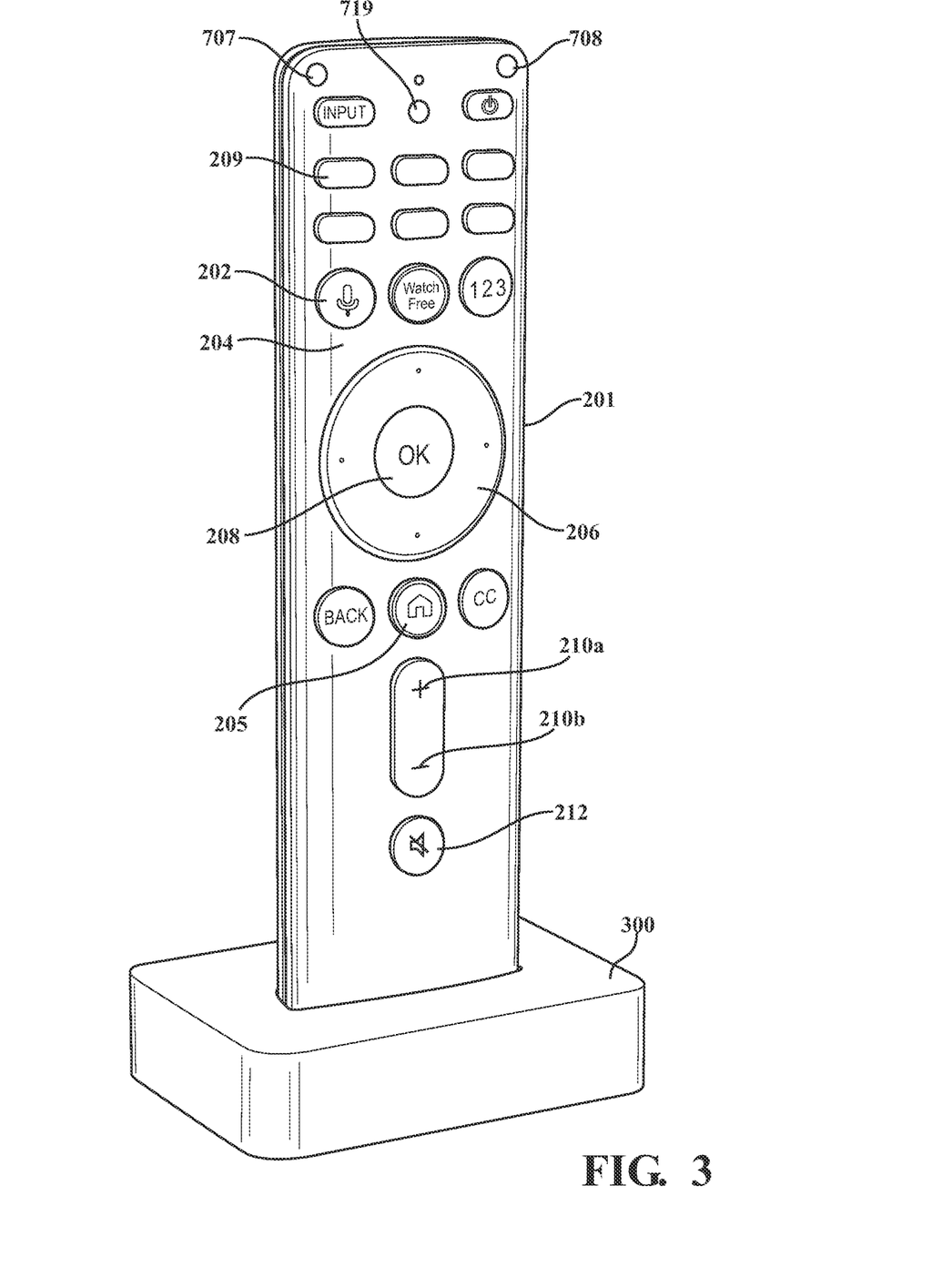
FIG. 3 is a perspective view of the remote control of FIGS. 2A-2B in a docked configuration.
Figure 7:
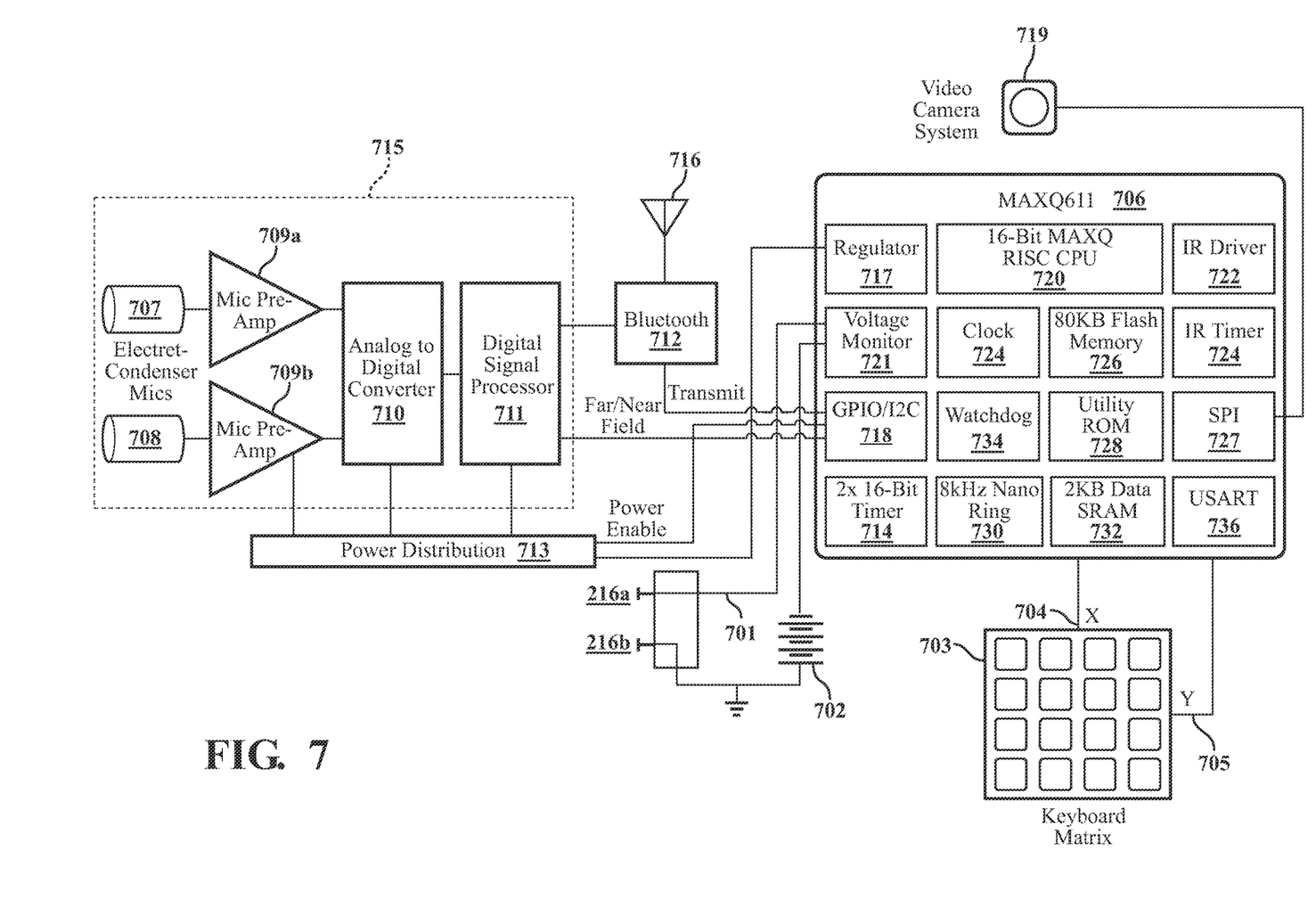
FIG. 7 is a control schematic diagram of the remote control of FIGS. 2A-6B used to illustrate exemplary circuitry for selectively supplying external or internal power to the microphone subsystem of the remote control.

Referring to FIG. 2A, a remote control 201 is depicted. Remote control 201 includes a near infrared diode (not shown in the figure) for transmitting signals to a corresponding receiver on smart TV 100. Keypad 204 includes a number of user control elements that are manipulable by a user to transmit corresponding commands to smart TV 100. Keys comprising keypad 204 are operatively connected to a keyboard matrix 703 of signal lines as shown in FIG. 7. A remote-control system comprising remote control 201 and a remote-control base (or base stand) 300 is depicted in FIG. 2B. Lower surface 301 of base station 300 is spaced part from upper surface 303 (FIG. 5A) along a height axis of remote-control base station 300 which is parallel to the length axis of remote control 201 when remote control 201 is in a docked configuration within remote control base station 300 as shown in FIG. 3. In preferred examples herein, the remote-control base station 300 connects the remote control 201 to an external power source, such as to a wall socket via a suitable DC power adapter (not shown).

Remote control 201 is generally rectangular and configured for hand-held operation to transmit television operational commands to smart TV 100. Remote control 201 includes a keypad 204 comprising a number of user controls each of which is actuatable to transmit a corresponding command to smart TV 100. The commands are transmitted via a near-infrared transmitter (not shown) to a corresponding receiver on smart TV 100 (not shown). Keypad 204 includes a set of content provider buttons 209 (e.g., VUDU, Netflix, Prime Video, etc.), each of which is manipulable (e.g., by depressing the buttons) to cause content to be transmitted to smart TV 100 from a server corresponding to the content provider.

A ring navigation controller 206 is provided and allows the user to navigate a cursor on the television display 102 to select graphics corresponding to desired commands. Enter button ("OK") sits in the center of the ring controller 206 and is actuatable to enter a command corresponding to whatever on-screen graphic the user has selected with ring controller 206. Keypad 204 also includes a home button 205, volume up 210a, volume down 210b, and mute 212 buttons.

Remote control 201 also includes a microphone subsystem 715 (FIG. 7) that includes first and second microphones 707 and 708. Microphone power button 202 allows a user to selectively energize the microphone subsystem 715 via an internal power source (e.g., batteries) when remote control 201 is disconnected from an external power source, such as when remote control 201 is removed from base station 300. However, when the remote control 201 is electrically connected to the base station 300, a user cannot power the microphone subsystem 715 from the internal power source.

Figures 4, 5A, 5B:
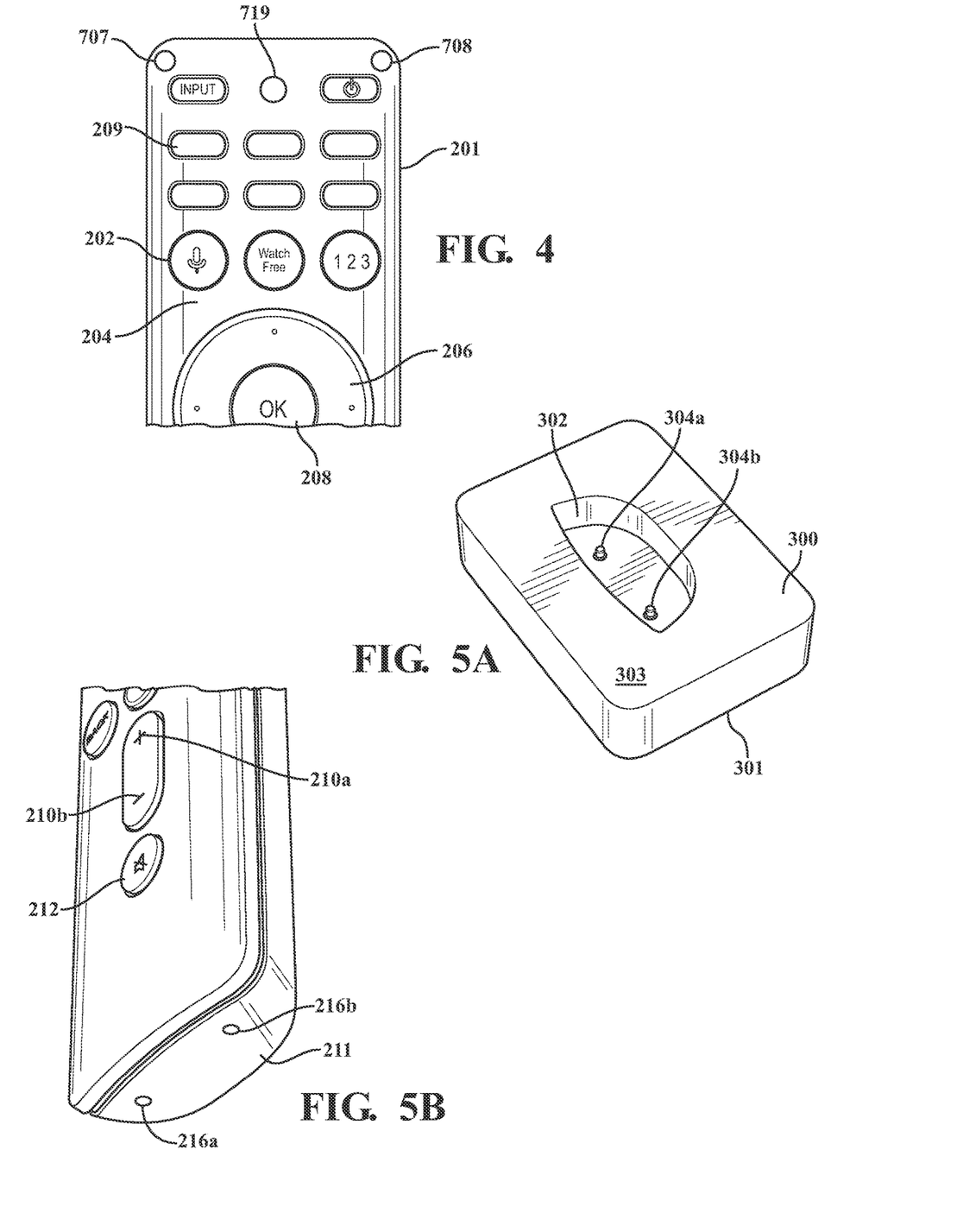
FIG. 4 is a close-up of an upper portion of the remote control of FIG. 3.
FIG. 5A is an embodiment of a remote-control power supply base for use with the remote control of FIGS. 2A-4.
FIG. 5B is a perspective view of a bottom portion of the remote control of FIGS. 2A-4.

Referring to FIG. 2B, remote control 201 has a bottom end 211 spaced apart from an upper end 213 along a length axis of the remote control 201. As best seen in FIG. 5B, bottom end 211 of remote control 201 includes a pair of electrically conductive contacts 216a and 216b which are spaced apart along a width axis of remote control 201.

Electrically conductive contacts 216a and 216b are engageable with a corresponding pair of electrically conductive contacts 304a and 304b located in recess 302 formed in upper surface 303 of remote-control base station 300.

Figure 5C:
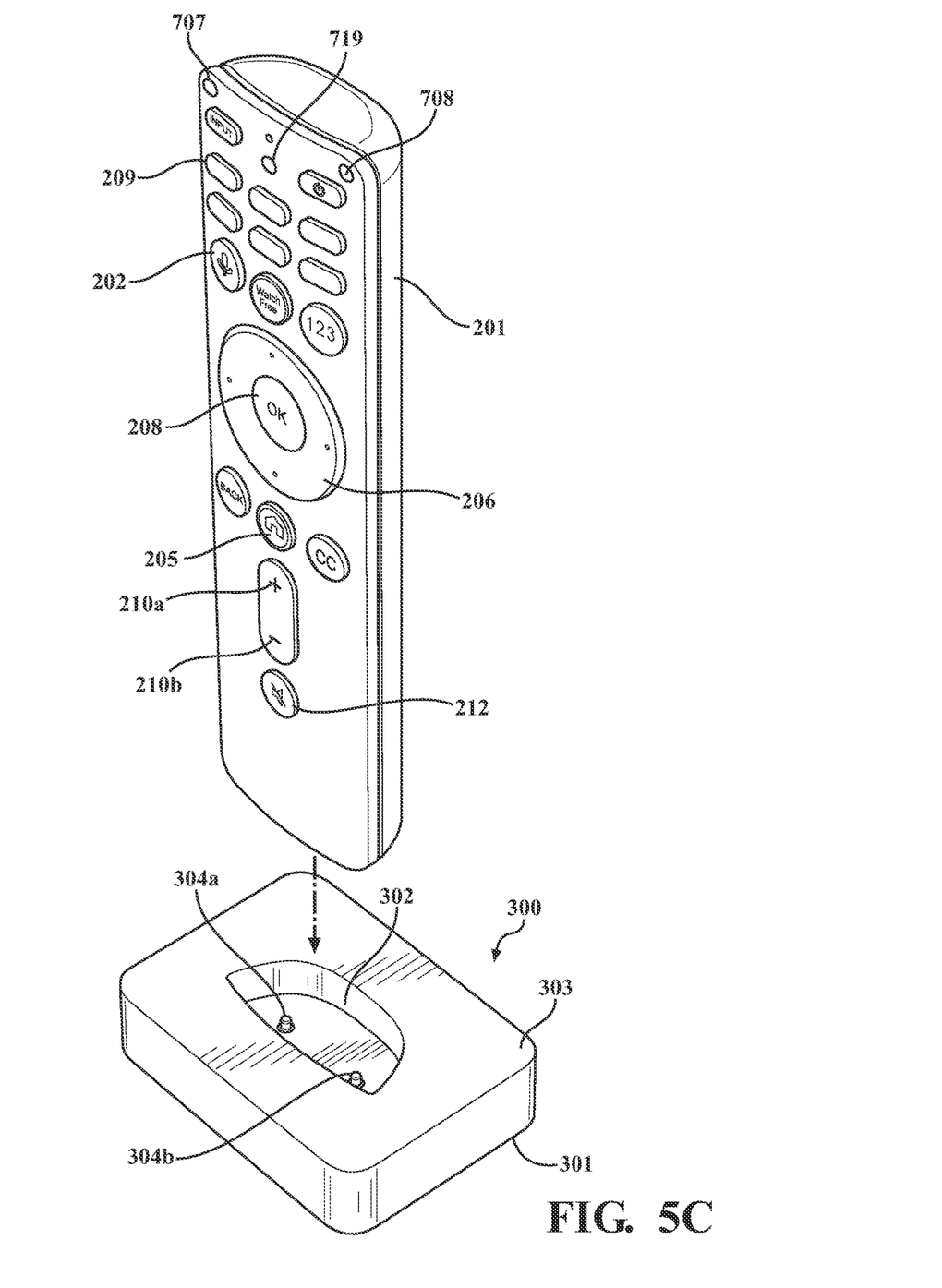
FIG. 5C is a perspective view of the remote control of FIGS. 2A-4 and the remote-control power supply base of FIG. 5A during a docking operation.

Contact pairs 216a and 216b and 304a and 304b may take a variety of forms. However, in the example of FIGS. 5A and 5B, contacts 216a and 216b are "Pogo" contacts, and contacts 304a and 304b are Pogo pins that are insertable within a respective one of the pogo contacts 216a and 216b. Pogo pins are spring-loaded and biased into an extended position so that if contacts 304a and 304b are pressed into bottom surface 211 of remote control 201 during a docking operation (such as the one shown in FIG. 5C) they will remain depressed. Once they are moved into alignment with their respective remote control electrical contacts 216a and 216b, the pogo pins will deploy outward and into engagement with the remote-control electrical contacts 216a and 216b to make secure electrical contact. In certain examples, remote control base recess 302 is shaped and dimensioned to correspond to the shape and dimensions of the bottom 211 of remote control 201 and a portion of remote control 201 above the bottom 211 along the remote control length axis in order to cause electrical contacts 304a and 304b to align with electrical contacts 216a and 216b whenever remote control 201 is inserted into recess 302 during a docking operation.

Referring to FIG. 7, a schematic diagram showing internal processors and circuitry in remote control 201 is depicted. In the example of FIG. 7, microphones 707 and 708 are, in one embodiment, first and second electret condenser microphones, respectively.

In the example of FIG. 7, the microphone subsystem 715 also includes a first microphone pre-amplifier 709a and a second microphone pre-amplifier 709b, which are respectively connected to microphone 707 and microphone 708. Voltage monitor 721 is in electrical communication with remote control electrical contacts 216a and 216b. When base station 300 is connected to an adapter plugged into a wall socket, electrical contacts 216a and 216b are selectively connectable to the base station 300 external power source by placing the remote control 201 in the base station 300 as shown in FIG. 3. When such connection to an external power source is made, voltage monitor 721 senses the presence of a voltage arising from the external power source connection, thereby enabling the supply of power from Power Distribution Module 713 to the microphone subsystem 715 such as via a circuit element that opens a transistor. In certain examples, the sensed voltage arising from the external power source connection is compared to a threshold voltage or threshold change in voltage in determining whether to enable the supply of power from the Power Distribution Module 713 to the microphone subsystem 715.

Microphone subsystem 715 may also include an analog to digital converter 710 and/or a digital signal processor 711. In the example of FIG. 7, the microphone subsystem 715 includes both analog to digital converter 710 and digital signal processor 711.

Microphones 707 and 708 receive acoustic soundwaves generated by a user's speech and convert them into analog audio signals that are amplified by pre-amplifiers 709a and 709b. The analog to digital converter 710 is connected to the first and second pre-amplifiers 709a and 709b, and the output of analog to digital converter 710 is a digital audio signal supplied to Digital Signal Processor 711 (DSP). Digital signal processor 711 in turn provides a processed digital audio signal to the Bluetooth transceiver 712 which transmits the signal to smart TV 100 from antenna 716. The transmitted signal is received by smart TV Wi-Fi antenna 1424a and network processor 1424 (FIG. 8) which includes a Wi-Fi receiver.

When the microphone subsystem 715 is connected to a source of external power, such as when the remote control 201 is docked in base station 300, signals from the microphone pair 707, 708 are processed by DSP 711 to provide a far-field mic array with beam forming, wherein the received audio provided by microphones 707 and 708 is focused to a narrow angle and adjusted in direction to find the highest volume of audio upon which it ceases scanning. When the user speaks into microphones 707 and 708, the resulting digital audio signal provided by the digital signal processor 711 is received via Bluetooth transceiver 712 and antenna 716 at the television wi-fi antenna 1424a, and speech recognition is performed by the processor system 1400 of the TV 100 or, in other embodiments, the speech signal is passed on to a cloud-based processing system for recognition. These external power mode signal processing functions may be carried out by CPU 720 executing corresponding computer executable instructions stored on a non-transitory computer readable medium such as flash memory 726.

Figure 6A:
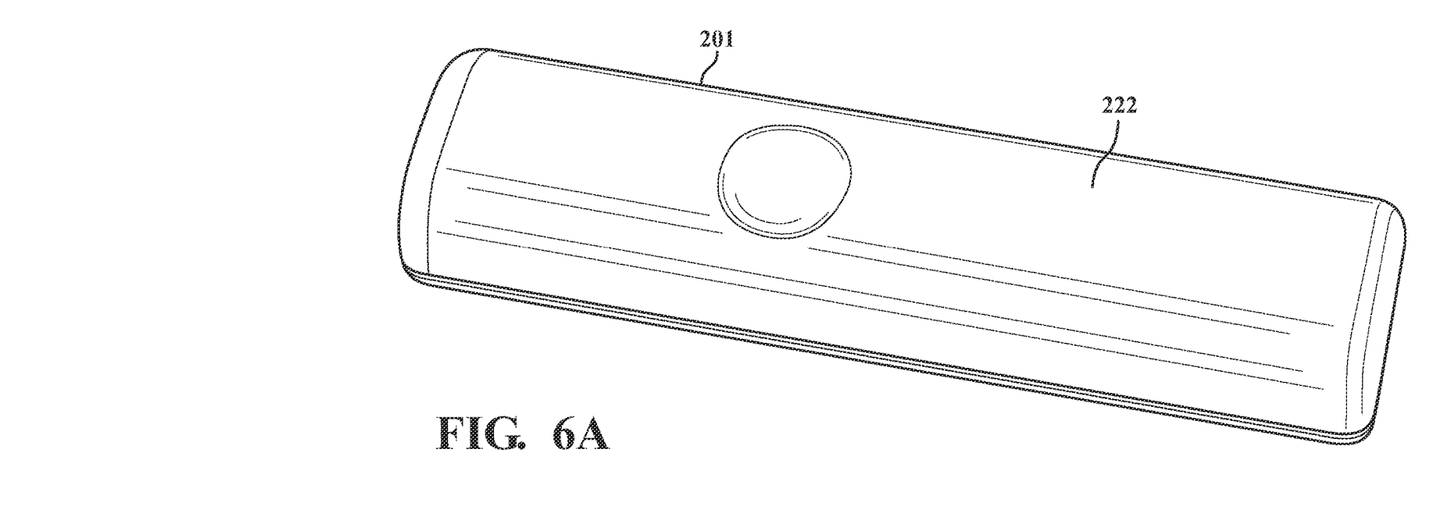
FIG. 6A is a perspective view of a rear portion of the remote control of FIGS. 2-4 showing the battery compartment cover in a closed configuration.
Figure 6B:
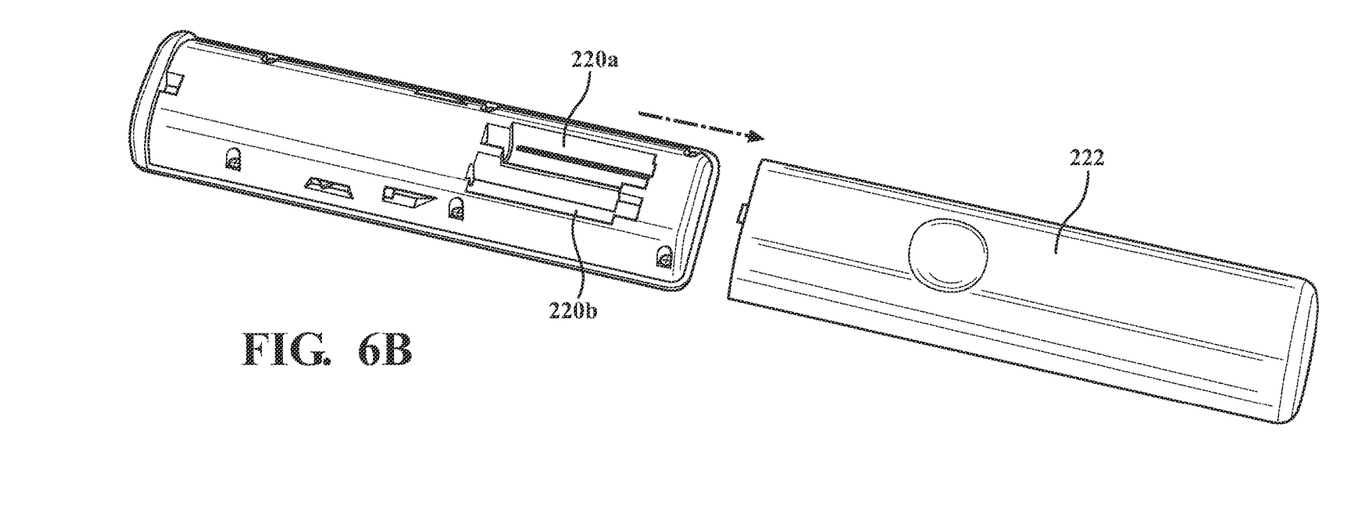
FIG. 6B is a perspective view of a rear portion of the remote of FIGS. 2A-5C showing a battery compartment in an open configuration with the batteries removed.

Remote control 201 also includes an internal DC power source 702. One example of an internal DC power source is a pair of AA or AAA batteries. Referring to FIGS. 6A and 6B, remote control 201 includes a removeable rear cover 222 which covers a pair of battery compartments 220a and 220b. Placing the batteries in the compartments 220a and 220b with the correct polarity orientation places the internal DC power source 702 in the circuit of FIG. 7 as indicated therein.

When remote control 201 is removed from base station 300, internal DC power source 702 is selectively connectable to the microphone subsystem 715 by depressing microphone power button 202. As described further below, in this exemplary implementation of an internal power supply mode, the entire remote-control circuit of FIG. 7 (except for watchdog circuit 734) is placed into a low power state until microphone power button 202 is depressed.

As indicated in FIG. 7, the DC power source 702 is also rechargeable by the base stand power source when remote 201 is docked in base station 300. When the remote control 201 is removed from base station 300, the microphone power button 202 is also operable to selectively connect the internal DC power source to the microphone subsystem 715. However, when the remote control 201 is docked in base station 300, the microphone power button 202 has no effect on the supply of power to the microphone subsystem 715.

Referring again to FIG. 7, remote control system on a chip (SOC) 706 comprises a voltage monitor 721, a regulator 717, a general-purpose input/output (GPIO) pin and I2C bus 718, a 2×16-bit timer 714, a CPU 720, IR driver 722, IR timer 724, flash memory 726, serial peripheral interface (SPI) 727, ROM 728, Nano Ring 730, watchdog circuit 734, data SRAM 732, and USART 736. Keyboard matrix 703 is operatively connected to x and y signal lines 704 and 705 to provide keyboard entry data to SOC 706.

When the remote control 201 is removed from the base station 300, the external voltage loss from contact 216a is detected by voltage monitor 721, causing processor 720 to return a power enable signal to power distribution module 713 via power enable signal line 740 to return to a standby state. In certain examples, the sensed voltage arising from the disconnection of the external power source (e.g., base station 300) is compared to a threshold voltage or threshold change in voltage in determining whether to return to a stand-by state.

The DSP 711 is signaled via I²C bus 718 to reconfigure the microphone subsystem for near-field microphone mode. In the near-field microphone mode, microphone 708 is disabled, and audio from microphone 707 is processed as a monaural signal prior to sending audio via Bluetooth 712 to the TV 100. Furthermore, in the off-base, hand-held, near-field mode, the entire remote control 201 electronics operate in a power-saving mode and do not activate to full-power until a user engages a control (e.g., by depressing a keyboard button), and until the engagement is detected on the keyboard matrix 703. The user depressing the microphone power button 202 on remote control 201 is one such event to cause the system to power up.

When operating remote control 201 in a hand-held mode, it is preferable to hold microphone 707 close to the mouth for accurate speech recognition as the voice to background noise will be at a minimum. With the remote 201 held in front of the face, the microphone subsystem 715 is most sensitive when in a near-field configuration, that is without beam forming. In the near-field configuration usually only one microphone is needed for speech transmission duties. Hence, when the remote control 201 is removed from base station 300, the processor 720 of the remote control 201 sends a data configuration signal via the I²C bus to the DSP 711 to cause the DSP 711 to process the digital audio from microphone 707 as a simple monaural signal with bandpass filtering that is optimal for speech recognition (300 Hz to 3000 Hz). These DC power supply mode signal processing functions may be carried out by CPU 720 executing corresponding computer executable instructions stored on a non-transitory computer readable medium such as flash memory 726.

However, it is not always convenient, nor might the user wish, to have to hold the remote control in front of the mouth. Thus, as mentioned previously, remote control 201 is operable in a far-field mode when the remote control 201 is docked in base station 300 as shown in FIG. 3. In the far-field mode, processing of audio signals from both microphone 707 and 708 is enabled, allowing audio received by microphones 707 and 708 to be processed by digital signal processor 711 as a beam forming array. As there is no microphone button to press in the far-field mode, the remote-control circuitry and microphone subsystem 715 of FIG. 7 remain on continuously. In certain examples, the remote-control circuitry and microphone subsystem 715 are powered up to full power upon detecting the utterance of a keyword by the user as opposed to detecting the engagement of a press-to-talk button. In any event, an always on, beam-forming microphone processing system would draw considerable power and would rapidly deplete a pair of batteries whether AA or AAA, whether two or four are employed. Thus, the remote-control systems of the present disclosure advantageously allow for operation in dual near-field and far-field microphone modes which rely on different power sources and different device powering schemes.

In accordance with one method of use of remote control 201, a user docks remote control 201 in base station 300 so that remote control electrical contacts 216a and 216b are in electrical contact with base contacts 304a and 304b. Voltage monitor 721 senses a voltage on remote control contact 216a, and power is enabled to power distribution module 713, causing power to be continuously supplied to microphone subsystem 715.

While at a distance from remote 201 (possibly at a distance at which the remote is beyond the user's reach), the user issues an oral "wake-up command" to begin using the microphones 707 and 708. The user then issues selected television operational commands, such as "go to Netflix", "increase volume," etc. The commands are amplified by the microphone preamplifiers 709a and 709b, converted to digital signals in analog to digital converter 710, and processed into far-field signals via a beam forming algorithm in digital signal processor 711. The far-field signals are transmitted to the television 100 via Bluetooth transceiver 712 and antenna 716. The transmitted commands are received by television at Wi-Fi antenna 1424a and are processed by network processor 1424 for use by any one of a number of apps 1406.

The user then decides to watch a TV show and removes remote control 201 from remote control base station 300, thereby disconnecting contacts 216a and 216b from the base stand source. The remote circuitry of FIG. 7 is placed in a low-power standby mode in which internal power source 702 is selectively connectable to microphone subsystem 715. Using the remote 201 the user selects an application 1406 from an on-screen menu displayed on television 100. The user is directed by a graphic or audible message to speak for purposes of verifying his or her identity through speech recognition software comprising part of the application. The user depresses microphone power button 202 and speaks while continuing to depress the button. The speech is received by microphone 707 and amplified by microphone pre-amplifier 709a. In this example, processing of audio from microphone 708 is disabled. One way this can be done is by configuring the digital signal processor 711 to ignore audio originating from microphone 708 when operating in the direct current power supply mode.

The speech amplified by microphone pre-amplifier 709a is converted to a digital signal in analog to digital converter 710 and is processed by digital signal processor 711 as a simple monaural signal with a bandpass filtering optimal for speech recognition (300 Hz to 3000 Hz) which is then transmitted to the TV 100 via Bluetooth transceiver 712 and antenna 716. The digital signal is received by TV Wi-Fi antenna 1424a and is processed by network processor 1424 for use by app <n> 1406.

In certain examples, it is convenient to provide a video camera 719 on remote control 201. As one example, such a video camera 719 may be useful for capturing user images processed by facial recognition software. In one implementation, video camera 719 captures an image or images of the user upon depressing the microphone power button 202 while holding the remote control 201. In this environment, the image or images are conveyed to the TV 100 of the invention that provides, among other uses, facial recognition for many useful applications such as security or online purchases.

In another embodiment, the video camera 719 remains energized whenever remote control 201 is docked in base station 300, and base station 300 is connected to a source of alternating current. In this embodiment, video camera 719 provides continuous video image data of the room or other area in which it is located. In this embodiment, the continuous video from the remote-control is transmitted via Bluetooth 712 to the TV 100 for applications such as motion detection for home security, video games, video watch parties, and video conferencing applications, to name but a few. In all of the continuous video use cases either the user is not present, or the user wishes not to hold the remote 201. In another example, the user may speak a reaction to a particular piece of content which is then transmitted as an audio or text message to another viewer watching the same content on another TV and/or stored in a database record keyed to the user and the content for future use in presenting content recommendations to the user. Video camera 719 may also capture facial expressions, which App <n> 1406 transmits to other viewers watching the same content or otherwise may use to identify future content recommendations.

Figure 8:
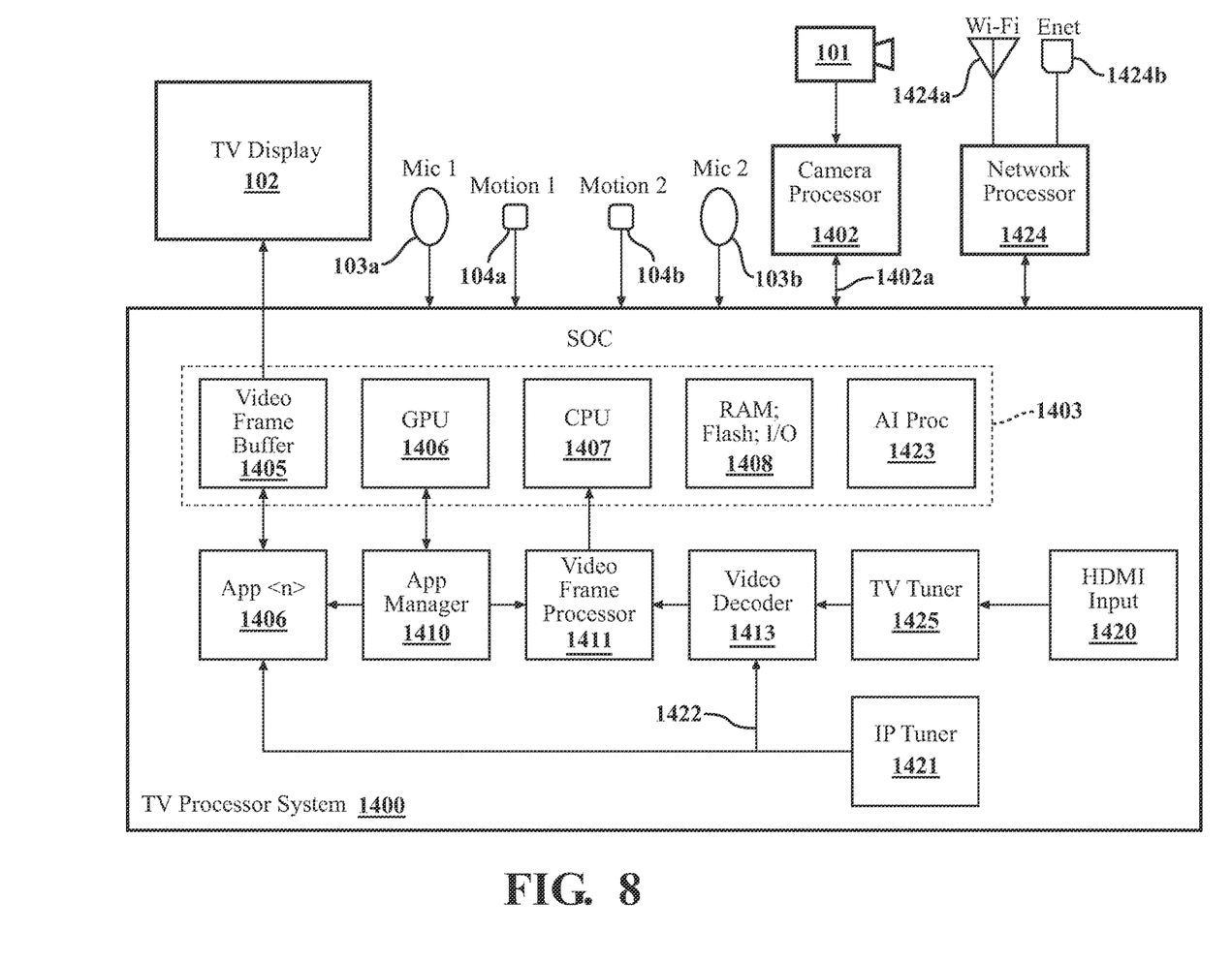
FIG. 8 is schematic view of a processing system of the smart TV of FIG. 1.

The processing system supporting the functionality of the smart TV 100 as disclosed herein, is summarized in FIG. 8. The TV Processing System 1400 is shown in a block diagram in FIG. 8 wherein television signals are received either from a set-top box via HDMI 1420, TV Tuner 1425, IP Tuner 421, the latter of which receives Internet Protocol video via Network Processor 1424 connected to a LAN via Wi-Fi antenna 1424*a* or Ethernet connection 1424*b*.

In addition to providing a video camera 719 on remote 201, TV 100 may also have one or more video cameras 101. Additional information regarding the environment directly in front of the TV 100 may be collected by one or more video camera systems 101 integrated into or associated with the TV 100. In FIG. 8, the system of the disclosure shows a block diagram providing the necessary functions of image reception, image manipulation (scaling, stitching, transforms, etc.), and software application (app) execution. The embodiment depicted in FIG. 8 is representative of a smart TV system and is provided for example only and is not intended to restrict the disclosure to this diagram.

The one or more instances of video camera 101 in combination with the camera processor 1402 associated with the smart TV system provides digital picture information to the processing system 1400. The processing system 1400 is typically implemented as a system-on-a-chip (SOC) 1403 consisting of a CPU 1407, a Graphical Processing Unit (GPU) 1406, RAM 1408, permanent storage (e.g.—flash memory) 1408, a video frame buffer 1405, a specialized Artificial Intelligence (AI) processor 1423 and other necessary elements for use in a processor system of a smart TV. The camera information 1402*a* (video stream) of the disclosure may be processed by the Video Frame Processor 1407 under the control of App Manager 1410 running in the memory of the SOC 1403 which processes the incoming camera video stream to act on the video information under the control of the particular application running in TV App <n> 1406, where "n" refers to a n integer corresponding to a particular application.

The TV App <n> 1406 may also be executing a video calling or conferencing application or executing an entertainment application such as a video "watch party" or otherwise processing video, both processing incoming video from the other end or ends of a video conference call as well as providing the network streaming to send the processed video of the Camera Processor 1402 through the Internet to the other parties of a multi-way video application. The App Manager 1410 may assist the one or more TV Apps <n> 1406 in processing the video broadcasts received by the TV Tuner 1425 or the HDMI Input 1420 received from a set-top box, or video received over the Internet by IP Network Interface 1422. In all examples, the App Manager 1410 does, among other things, the processing of the composite video output of any TV Apps <n> 1406 that are currently active in memory so that the composite video picture involving local and remote video sources and whatever other elements such as graphic overlays generated by TV Apps <n> 1406 are scaled and positioned appropriate to the executing application or service.

What is claimed is:

1. A remote control, comprising:
a microphone subsystem operatively connected to a transceiver, the microphone subsystem comprising at least one microphone;
remote-control electrical contacts for connecting the remote control to an external power source; and
an internal power source, wherein when the remote-control electrical contacts are connected to the external power source, the external power source continuously energizes the microphone subsystem, and
a user control operable to selectively connect the internal power source to the microphone subsystem only when the remote-control electrical contacts are not connected to the external power source.

2. The remote control of claim 1, wherein when the remote-control electrical contacts are connected to the external power source, the external power source recharges the internal power source.

3. The remote control of claim 1, wherein the at least one microphone is a first microphone and a second microphone.

4. The remote control of claim 3, wherein the microphone subsystem further comprises at least one pre-amplifier.

5. The remote control of claim 4, wherein the microphone subsystem further comprises an analog to digital converter operatively connected to the at least one pre-amplifier.

6. The remote control of claim 5, wherein the microphone subsystem further comprises a digital signal processor connected to the analog to digital converter.

7. The remote control of claim 1, wherein the transceiver is a Bluetooth transceiver.

8. The remote control of claim 1, wherein when the remote-control electrical contacts are connected to an external power source, the internal power source is not selectively connectable to the microphone subsystem.

9. The remote control of claim 1, further comprising a video camera system.

10. A remote control system, comprising:
the remote control of claim 1; and
a remote-control base station configured to hold the remote control, the remote-control base station comprising base electrical contacts configured to engage the remote-control electrical contacts and electrically connect a wall-socket adapter connected to the base station and a wall socket to the microphone subsystem.

11. A remote control, comprising:
a microphone subsystem operatively connected to a transceiver, the microphone subsystem comprising at least one microphone;
remote-control electrical contacts for connecting the remote control to an external power source;
an internal power source, wherein when the remote-control electrical contacts are connected to the external power source, the external power source continuously energizes the microphone subsystem, and when the remote-control electrical contacts are not connected to the external power source, the internal power source is selectively connectable to the microphone subsystem, and
a voltage monitoring circuit configured to detect a change of voltage across the remote-control electrical contacts, wherein when the voltage monitoring circuit detects a threshold change of voltage across the remote-control electrical contacts, the internal power source is selectively connectable to the microphone subsystem by a remote-control user.

12. A remote control, comprising:
a microphone subsystem operatively connected to a transceiver, the microphone subsystem comprising a first microphone, a second microphone, at least one pre-amplifier, an analog to digital converter operatively connected to the at least one pre-amplifier, and a digital signal processor connected to the analog to digital converter;
remote-control electrical contacts for connecting the remote control to an external power source;
an internal power source, wherein when the remote-control electrical contacts are connected to the external power source, the external power source continuously energizes the microphone subsystem, and when the remote-control electrical contacts are not connected to the external power source, the internal power source is selectively connectable to the microphone subsystem, wherein when the remote-control electrical contacts are not connected to the external power source, the digital signal processor does not process audio signals from the second microphone.

13. A remote control, comprising:
a microphone subsystem operatively connected to a transceiver, the microphone subsystem comprising at least one microphone;
remote-control electrical contacts for connecting the remote control to an external power source; and
an internal power source, wherein when the remote-control electrical contacts are connected to the external power source, the external power source continuously energizes the microphone subsystem, and when the remote-control electrical contacts are not connected to the external power source, the internal power source is selectively connectable to the microphone subsystem; and
a keyboard matrix operatively connected to a microphone power button, wherein when the remote-control electrical contacts are not connected to the external power source, the microphone power button is operable to selectively connect the internal power source to the microphone subsystem.

14. A remote control, comprising:
a microphone subsystem operatively connected to a transceiver, the microphone subsystem comprising at least one microphone;
remote-control electrical contacts for connecting the remote control to an external power source; and
an internal power source, wherein when the remote-control electrical contacts are connected to the external power source, the external power source continuously energizes the microphone subsystem, and when the remote-control electrical contacts are not connected to the external power source, the internal power source is selectively connectable to the microphone subsystem; and
a video camera system, wherein the remote control is configured to transmit video data captured by the video camera system to an external device.

15. A remote control, comprising:
a microphone subsystem operatively connected to a transceiver, the microphone subsystem comprising at least one microphone;
remote-control electrical contacts for connecting the remote control to an external power source; and
an internal power source, wherein when the remote-control electrical contacts are connected to the external power source, the external power source continuously energizes the microphone subsystem, and when the remote-control electrical contacts are not connected to the external power source, the internal power source is selectively connectable to the microphone subsystem, wherein when the remote-control electrical contacts are connected to an external power source, the microphone subsystem processes speech received via the at least one microphone as a far-field microphone array with beam forming.

16. A method of transmitting speech audio signals to an external device, the method comprising:
providing a remote control having a microphone subsystem comprising at least one microphone, wherein the microphone subsystem is connected to an external power source;
disconnecting the microphone subsystem from the external power source, thereby causing the microphone subsystem to be selectively connectable to an internal power source; and
operating a control on the remote control to selectively connect the microphone subsystem to the internal power source; and
speaking into the microphone.

17. The method of claim 16, wherein the microphone subsystem further comprises an analog to digital converter and a digital signal processor operatively connected to the at least one microphone.

18. The method of claim 16, further comprising:
converting speech detected by the microphone to an audio signal; and
transmitting the audio signal to the external device.

19. A non-transitory, computer readable medium having a set of computer executable instructions stored thereon, wherein when executed by a processor, the instructions perform a method comprising the following steps:
detecting whether a remote control comprising the processor, a user control, and a microphone subsystem operatively connected to a transceiver is electrically connected to an external power source, and
configuring the microphone subsystem for selective connection to an internal power source in response to a selected user manipulation of a control on the remote control and in response to determining the remote control is not electrically connected to the external power source.

* * * * *